United States Patent Office 3,210,688
Patented Oct. 5, 1965

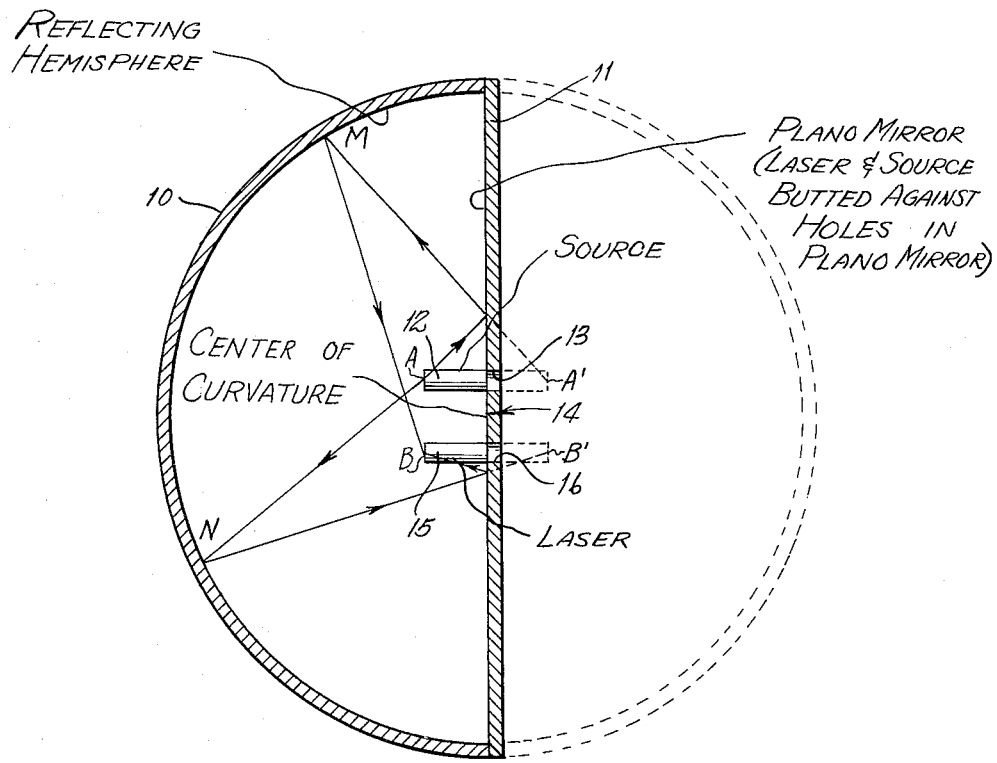

---

3,210,688
OPTICAL COUPLING MEANS FOR LASERS
George R. Simpson, South Woodstock, Conn., assignor to American Optical Company, Southbridge, Mass., a voluntary association of Massachusetts
Filed Sept. 10, 1962, Ser. No. 222,324
8 Claims. (Cl. 331—94.5)

This invention relates to optical masers and lasers and has for one object to provide an efficient optical coupling means for pumping an optical maser or laser which provides a short working distance. It has hitherto been proposed to provide a pumping means utilizing a reflecting sphere which has marked superiority over the well known pumping means utilizing a reflecting cylinder.

However, in the case of a reflecting sphere when the laser rod consists of a glass clad laser core, the laser power output is often emitted in a relatively large solid angle, for example in the order of 1 steradian, and in such case it is practically impossible to get the laser power output out of the sphere without removing part of the sphere and thereby reducing the optical coupling efficiency.

This invention has marked advantages over the use of a spherical mirror or mirrors and is illustrated in the single figure of the drawings, to which reference may now be had.

The pumping system is composed of a reflecting hemisphere 10 butted against a plano reflector 11. A source of light in the form of a short lamp tube 12 is attached to and butted against a hole 13 near the center of the plano reflector 11, which is also the center of curvature of the hemisphere 10 and projects a short distance into the reflecting hemisphere 10 and perpendicular to the plano reflectors 11. A laser rod 15, is located at an equal distance on the opposite side of the center of curvature 14 of the hemispherical mirror from the source 12 and is attached to and butted against a hole 16 in the plano mirror surface and projects into the reflecting hemisphere 10 parallel to the source and perpendicular to the plano mirror.

The plano mirror forms a virtual image of the source, laser and hemisphere, as illustrated in dotted or broken lines in the drawings.

Two typical rays are traced. Light emitted from the source at point A strikes the hemisphere at N and is reflected towards B' which is the virtual image of B. It is reflected by the plano mirror and impinges up the laser at point B.

Light emitted from the source at point A is reflected by the plano mirror such that it appears to come from the virtual image A' of source point A. This ray strikes the hemisphere at point M and is imaged upon the laser at point B. In this manner point B and every other point of the laser are irradiated by $4\pi$ steradians. The emitting end of the laser rod is butted against the plano mirror at hole 16 therein and is accessible to any other instrumentation of very short working distance.

The invention has a number of advantages, including the following:

The hemisphere is less bulky than the full sphere although the laser is equally irradiated;

The plano mirror is easier and cheaper to produce than the hemisphere which it replaces; and A short working distance is one of the outstanding advantages which will be readily appreciated by those skilled in the art.

The use of a complete sphere has a disadvantage if used with a laser rod which consists of a glass clad core, because the laser power output is often emitted in a relatively large solid angle and part of the sphere in such cases must be removed to get the full laser power output. If this expedient is used, the optical coupling efficiency is substantially reduced.

According to this invention the emitting end of the laser rod is mounted on the plano mirror at the hole 16 and is accessible to any other instrumentation of very short working distance. This invention is peculiarly well adapted for use with a glass clad laser core.

Variations and modifications will be apparent to those skilled in this art, and only such limitations should be imposed as are indicated in the appended claims.

I claim:

1. A laser structure which comprises a hemispherical reflector, a plano mirror covering the opening in the reflector and abutting against it, a laser and a light source mounted on the mirror at equal distances on opposite sides of the center of curvature of the hemisphere and parallel to each other, and means for permitting the laser power to be emitted through the mirror.

2. A pumping system for lasers which comprises a hemisphere having an inner reflecting surface, a plano mirror covering the opening the hemisphere and against which the hemisphere abuts, a laser rod and a light source of similar size and shape mounted on the plano mirror at equal distances on opposite sides of the center of curvature of the hemisphere and extending inwardly perpendicular to the plano mirror, and means for permitting the laser to emit power outwardly through the plano mirror.

3. The structure of claim 1 in which the laser and light source are of substantially equal length which is substantially less than the radius of the hemisphere.

4. The structure of claim 2 in which the laser and light source are of substantially equal length which is substantially less than the radius of the hemisphere.

5. A pumping system for lasers which comprises a hemisphere having an inner reflecting surface, a plano mirror covering the opening in the hemisphere and against which the hemisphere abuts, said mirror having two holes equidistant on opposite sides of the center of curvature of the hemisphere, a laser rod and a source of light of substantially the same size and shape as the laser rod mounted in the respective holes in the mirror and extending into the hemisphere in parallel relation to each other and perpendicular to the plano mirror, laser power being emitted through the hole in the plano mirror in which it is mounted and the radius of the hemisphere being large relative to the size and spacing of the laser and the light source.

6. The structure of claim 5 in which the laser and light source are in close proximity.

7. The structure of claim 1 in which the laser and light source are of substantially equal length, which is substantially less than the radius of the hemisphere, the emitting end of the laser rod being at the plano mirror whereby it is accessible through said means to other instrumentation of short working distance.

8. The structure of claim 2, in which the laser and light source are of substantially equal length, which is substatnially less than the radius of the hemisphere, the emitting end of the laser rod being at the plano mirror whereby it is accessible through said means to other instrumentation of short working distance.

References Cited by the Examiner
UNITED STATES PATENTS
2,943,174   6/60   Parker _____ 331—94.5

FOREIGN PATENTS
125,669   9/60   Russia.

OTHER REFERENCES

Kaiser et al.: "Fluorescence and Optical Maser Effects in $CaF_2$: $Sm^{++}$," Physical Review, vol. 123, No. 3, Aug. 1, 1961, pp. 766–776, p. 771, Fig. 7 relied upon.

JEWELL H. PEDERSEN, *Primary Examiner*.